United States Patent
Mirsky (10) Patent No.: US 10,771,312 B2
(45) Date of Patent: Sep. 8, 2020

(54) FAILURE DETECTION IN A DATA NETWORK

(71) Applicant: ZTE Corporation, Shenzhen (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/908,636

(22) Filed: Feb. 28, 2018

(65) Prior Publication Data

US 2019/0268256 A1 Aug. 29, 2019

(51) Int. Cl.
| | | |
|---|---|---|
| H04L 12/24 | (2006.01) | |
| H04L 29/08 | (2006.01) | |
| H04L 12/26 | (2006.01) | |
| H04L 29/06 | (2006.01) | |
| H04L 12/721 | (2013.01) | |
| H04L 12/751 | (2013.01) | |

(Continued)

(52) U.S. Cl.
CPC ........ *H04L 41/0622* (2013.01); *H04L 41/064* (2013.01); *H04L 41/0631* (2013.01); *H04L 41/0681* (2013.01); *H04L 43/0823* (2013.01); *H04L 43/10* (2013.01); *H04L 43/16* (2013.01); *H04L 45/026* (2013.01); *H04L 45/72* (2013.01); *H04L 45/745* (2013.01); *H04L 63/0236* (2013.01); *H04L 63/126* (2013.01); *H04L 67/143* (2013.01); *H04L 67/145* (2013.01); *H04L 67/146* (2013.01); *H04L 69/28* (2013.01); *H04L 69/40* (2013.01); *H04L 45/16* (2013.01); *H04L 49/201* (2013.01)

(58) Field of Classification Search
CPC ..... H04L 43/50; H04L 67/143; H04L 67/145; H04L 67/146; H04L 41/0686; H04L 69/28; H04L 49/201; H04L 29/06993; H04L 29/08603; H04L 29/08612; H04L 29/08621

See application file for complete search history.

(56) References Cited

U.S. PATENT DOCUMENTS 8,953,460 B1 * 2/2015 Addepalli ............... H04L 43/10
370/241
9,497,107 B1 11/2016 Akiya et al.
(Continued)

FOREIGN PATENT DOCUMENTS

| CN | 1909470 | 2/2007 |
|---|---|---|
| CN | 101132320 | 2/2008 |
| CN | 101252584 | 8/2008 |

OTHER PUBLICATIONS

Fenner, B., et al., "Protocol Independent Multicast—Sparse Mode (PIM-SM): Protocol Specification (Revised)," Internet Engineering Task Force (IETF), RFC 7761, ISSN: 2070-1721, pp. 1-137, Mar. 2016.

(Continued)

*Primary Examiner* — Joshua Kading
(74) *Attorney, Agent, or Firm* — Perkins Coie LLP (57) ABSTRACT

A first network node generates a message to be transmitted to a second network node. The message can include a value that identifies a type of the operational session, an identifier of the first network node that can control transmission of packets used during the operational session, and a length of the identifier. Further, the first and second network nodes can operate in an operational session in which the second network node can detect a failure.

20 Claims, 7 Drawing Sheets

(51) Int. Cl.
*H04L 12/741* (2013.01)
*H04L 29/14* (2006.01)
*H04L 12/931* (2013.01)
*H04L 12/761* (2013.01)

(56) References Cited

U.S. PATENT DOCUMENTS

| | | | | |
|---|---|---|---|---|
| 2007/0180104 | A1* | 8/2007 | Filsfils | H04L 45/02 709/224 |
| 2008/0037436 | A1* | 2/2008 | Liu | H04L 12/4633 370/250 |
| 2009/0279440 | A1* | 11/2009 | Wong | H04L 41/0631 370/242 |
| 2011/0219443 | A1* | 9/2011 | Hampel | H04L 63/029 726/11 |
| 2015/0188814 | A1* | 7/2015 | Jain | H04L 45/74 370/392 |
| 2017/0104828 | A1* | 4/2017 | Brown | H04L 67/142 |
| 2017/0244625 | A1* | 8/2017 | Meng | H04L 43/0811 |
| 2018/0131570 | A1* | 5/2018 | Lee | H04L 12/4641 |
| 2018/0367451 | A1* | 12/2018 | Gulrajani | H04L 45/16 |
| 2019/0158394 | A1* | 5/2019 | Chalapathy | H04L 41/0816 |

OTHER PUBLICATIONS

Katz, D., et al., " Bidirectional Forwarding Detection (BFD)," Internet Engineering Task Force (IETF), RFC 5880, ISSN: 2070-1721, pp. 1-49, Jun. 2010.

Katz, D., et al., "BFD for Multipoint Networks draft-ietf-bfd-multipoint-14," Internet Engineering Task Force (IETF), Internet-Draft, pp. 1-18, Feb. 2018.

Zheng, Z., et al., "PIM DR Improvement draft-ietf-pim-dr-improvement-04.txt," Internet Engineering Task Force (IETF), PIM WG, Internet-Draft, pp. 1-11, Dec. 2017.

International Search Report and Written Opinion for Patent Application No. PCT/CN2019/076475, dated May 17, 2019 (9 pages).

* cited by examiner

FIG. 1

| PIM Ver 202 | Type 204 | Reserved 206 | Checksum 208 |
|---|---|---|---|
| OptionType1 210a | | | OptionLength1 212a |
| OptionValue1 214a | | | |
| OptionType2 210b | | | OptionLength2 212b |
| OptionValue2 214b | | | |

| Type 220 | Length 222 |
|---|---|
| | My Discriminator 224 |

FAILURE DETECTION IN A DATA NETWORK

TECHNICAL FIELD

The present disclosure relates to packet data communications networks.

BACKGROUND

Multicast networking can refer to group communication in which packets are addressed to a group of multiple receiving devices. Using multicast networking, packets may be transferred through a communication network such that a single transmission of the packet intended to reach multiple devices is made at least in some portion of the communication network. Multicast networking can be used to deliver services for technologies such as Internet Protocol Television (IPTV), video-conferencing, or cloud computing.

SUMMARY

Techniques for failure detection in a data network are disclosed. In some embodiments, the techniques may be embodied in a multicast network for failure detection.

An exemplary embodiment discloses a packet communication method that includes generating, by a first network node, a message for transmission to a second network node. The first and second network nodes are configured to operate in an operational session in which the second network node is configured to detect a failure. The message includes a value that identifies a type of the operational session, an identifier of the first network node configured to control transmission of packets used during the operational session, and a length of the identifier. The packet communication method also includes transmitting, by the first network node, the message to the second network node.

In some embodiments, the exemplary packet communication method further includes transmitting, by the first network node, packets that include the identifier of the first network node, where the packets are transmitted based on a pre-determined packet transmission interval during the operational session.

In some embodiments, the message includes a Hello message to operate the first and second network nodes in a Protocol Independent Multicast Sparse Mode (PIM-SM). In some embodiments, the operational session is a Bidirectional Forwarding Detection (BFD) session. In some embodiments, the identifier includes a My Discriminator value and the first network node includes a Designated Router (DR) or a Backup Designated Router (BDR).

Another exemplary embodiment discloses a packet communication method, comprising starting, by a network node that operates in an operational session to detect a failure, a timer associated with a pre-determined packet transmission interval value, receiving a packet by the network node, determining, by the network node, that the packet includes a first identifier that is same as a second identifier of another network node configured to operate in the operational session to control a transmission of packets, and resetting, after the determining, the timer by the network node.

In some embodiments, the exemplary packet communication method further includes receiving, by the network node and prior to the receiving of the packet, a message that includes a value that identifies a type of the operational session, the second identifier of the another network node, and a length of the second identifier. In some embodiments, the exemplary packet communication method further includes closing, by the network node, the operational session in response to receiving a message with an absence of a value that identifies a type of the operational session, the second identifier of the another network node, and a length of the second identifier.

In some embodiments, the packet is received by the network node while the timer is running.

In some embodiments, the exemplary packet communication method further includes sending, by the network node after an expiration of the timer, another packet to another node, where the another packet includes a status field that indicates that the operational session is inactive. In some embodiments, the exemplary packet communication method further includes dropping the packet in response to determining that the first identifier is different from the second identifier of the another node.

In some embodiments, the network node and the another network node operate in a Protocol Independent Multicast Sparse Mode (PIM-SM). In some embodiments, the operational session is a Bidirectional Forwarding Detection (BFD) session. In some embodiments, the second identifier includes a My Discriminator value and the another network node includes a Designated Router (DR) or a Backup Designated Router (BDR).

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Recent developments in data communication and networking technologies have made it possible to provide greater bandwidth data to user devices. However, user demand for data is always increasing. For example, with proliferation of user devices such as smartphones and tablets that are ubiquitously present everywhere and tend to be always on and are often used, the demand for bandwidth is increasing, both at each individual user device, and collectively in the network that carries the data from and to multiple users. High bandwidth applications such as video streaming and gaming tend to be bandwidth hungry. Equipment vendors, service providers, and network operators are continually looking for technology advances to keep up with the ever-growing data communication demand.

Multicasting is an example of one such technology to achieve bandwidth efficiency in core networks (e.g., networks that carry aggregate data traffic for multiple users). For example, when multiple user devices are watching a same streaming video content, then multicasting allows the network to carry packets of the video content just once, instead of repeating video packets for sending to each user. In the Internet Protocol (IP) technology area, several techniques for efficiently creating multicast groups of user devices, and routing packets through the network using multicast packets have been proposed.

Protocol Independent Multicast Sparse Mode (PIM-SM) is a type of multicast routing protocol that can calculate paths to forward multicast packets. A network that is part of a multicast domain can include one or more segments that may use shared-media links, such as Ethernet. In a multicast domain network, an operation can have more than one PIM-SM router on the Ethernet segment to improve resiliency of multicast network, thus increasing their quality of experience for an end user. The Designated Router (DR) is elected to perform special tasks on behalf of directly connected hosts such as forwarding multicast control messages to the Rendezvous Point (RP) node. However, various events can disrupt delivery of multicast packets thus negatively affecting the quality of service. Such events can include a change in unicast routing or a DR failure that causes its PIM-SM neighbors on the same Ethernet segment to elect new DR. As further explained in this patent document, the time to detect a DR failure can be in seconds and can sometimes be in the tens of seconds, and during that time, the flow of multicast packets over that Ethernet segment ceases. The technologies disclosed in this patent document can, among other things, improve failure detection time.

Figure 1:
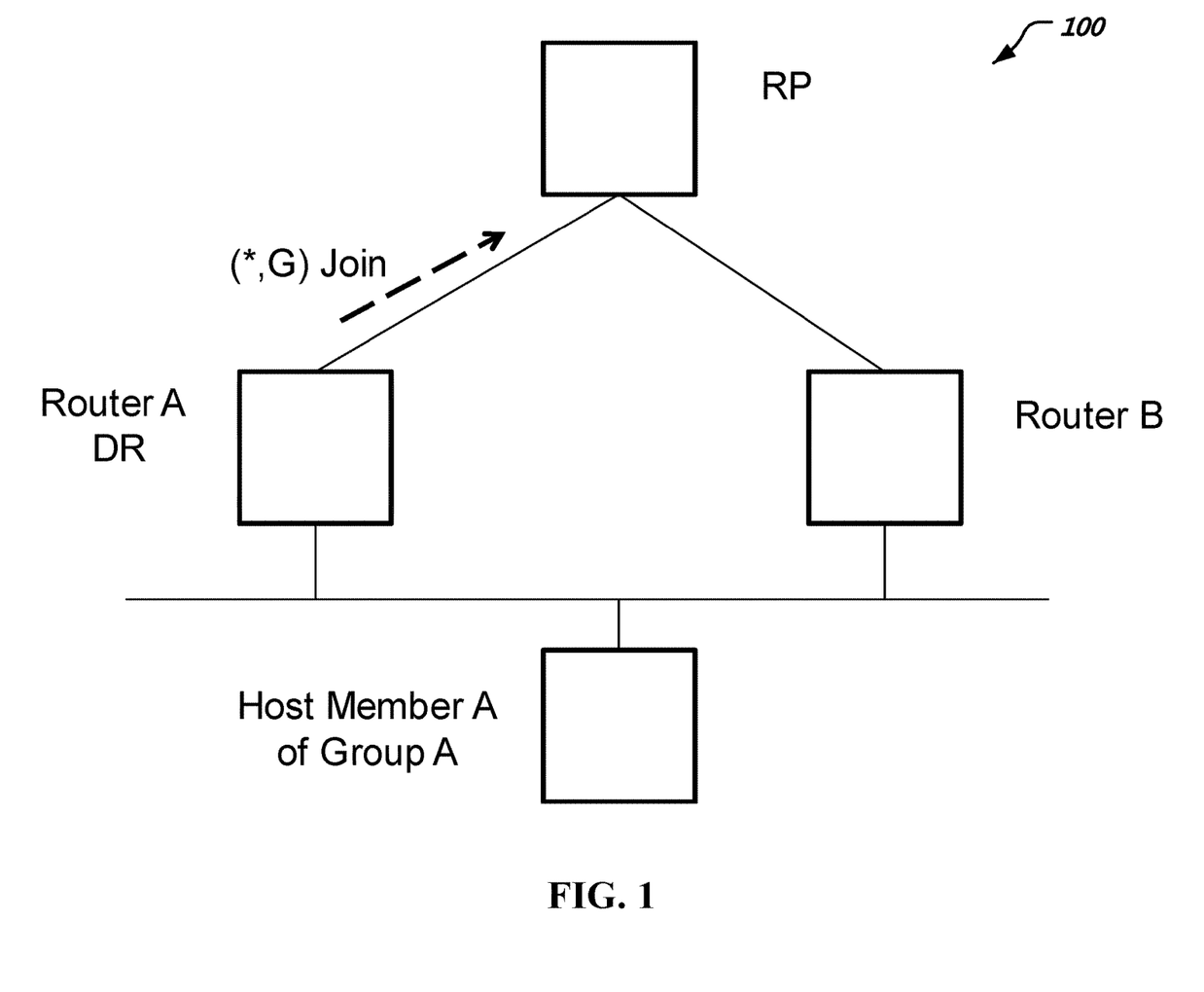
FIG. 1 is an exemplary network that can use Protocol Independent Multicast Sparse Mode (PIM-SM) to route packets.

FIG. 1 is an exemplary network 100 that can use PIM-SM to route packets. PIM-SM can build unidirectional shared trees rooted at a Rendezvous Point (RP) per multicast group and, can optionally create shortest-path trees per source. The designated router (DR) is responsible for sending PIM register and PIM join and prune messages toward the RP to inform it about active sources and host group membership. If there are multiple PIM-SM devices on a LAN, a DR is elected to avoid duplicating multicast traffic for connected hosts. In FIG. 1, Router A is elected DR on the shared Ethernet segment. Host Member A, which can be an active receiver for the multicast group A, is also connected to the segment. Because only PIM DR sends join message (*, G) to join to the RP, Router B does not receive multicast traffic from the RP for Host Member A.

A RP can be a router configured to be used as the root of the non-source-specific distribution tree for a multicast group. Join messages from receivers for a group are sent towards the RP router, and data from senders (not shown) is sent to the RP router so that receivers can discover who the senders may be and can start receiving traffic destined for the group.

In FIG. 1, the sources, routers, and receivers can be connected to each other using a shared media, such as Ethernet. On a shared-media the connected PIM-SM routers can send and receive multicast Hello messages to discover each other and to elect and operate a DR. The Hello messages can inform the routers as to what interfaces have PIM neighbors. Neighbors of the DR can detect a failure and start new DR election process after an expiration of a timer known as Neighbor Liveness Timer (NLT). The default value of the NLT is 105 seconds, which is obtained by multiplying by 3.5 the default value of the periodic interval for the Hello Message, which is 30 seconds. Accordingly, the fastest DR failure detection that is possible is 3.5 seconds if the value for the Hello Message is set to 1 second. However, a 3.5 second delay between a failure and a detection of that failure can cause loss of a large volume of data and require expensive re-transmissions. Thus, reducing the time required to detect DR failure by its neighbors can lead to one or more beneficial results, such as expediting convergence on PIM-SM nodes on that network segment by recovering or restoring service, lowering data re-transmissions, or improving network utilization.

This patent document describes an exemplary Bidirectional Forwarding Detection (BFD) session for multipoint networks that can monitor unidirectional rooted paths and enable detection of path continuity between the Multipoint-Head of a tree, such as a multipoint sender or router, and one or more MultipointTails, such as multipoint receivers or other routers, within a sub-second period of time. A BFD session can include an operational failure detection session where a device operating as a MultipointHead can be responsible for a periodic packet transmission along multipoint paths that are received by one or more devices operating as MultipointTails located on the multipoint paths. During a BFD session, if a number of packets are not received by one or more MultipointTails, the one or more MultipointTails can declare that the MultipointHead or a path from the MultipointHead to the MultipointTail is down. Unlike in a conventional point-to-point (p2p) BFD where a BFD session can be used to monitor continuity between only two end nodes, the exemplary multipoint BFD session facilitates continuity monitoring between a point and multiple points (p2mp). Further, unlike in p2p BFD, in the exemplary p2mp BFD there is no timer negotiation and there is no three-way handshake because the MultipointTails do not send BFD control packets to the MultipointHead. In the exemplary p2mp BFD, the MultipointHead can control transmission interval and thus, the detection time of its failure. For example, the MultipointHead, such as a DR can control the transmission interval of the BFD packets so that a failure can detected in a sub-second time interval. To further illustrate the benefit of using the BFD packet for failure detection, the DR can set the transmission interval of the BFD packet in the millisecond range, for example, 3.3 ms, 100 ms, or 300 ms. Accordingly, an exemplary multipoint BFD session can be created for shared-media segments of multicast domains that use PIM-SM multicast routing protocol to allow faster DR failure detection. Applying the exemplary multipoint BFD to a PIM-SM network can lead to one or more beneficial results such as an improved network recovery or an increased multicast service quality.

In some embodiments, a DR can assume the role of a MultipointHead of BFD session, and all the other PIM-SM routers on the same Ethernet segment can be Multipoint-Tails. As the MultipointHead, the DR can starts sending BFD control messages or packets at a pre-determined transmission interval, as explained in this patent document. In order to bootstrap BFD session on its PIM-SM neighbors on the Ethernet segment, the DR can include a BFD Discriminator Type-Length-Value (TLV) into the PIM Hello message as described in FIG. 2B. Upon receiving the Hello message with BFD Discriminator TLV from the DR for the first time, all other PIM-SM nodes on the same Ethernet segment can create a BFD session as MultipointTail. The exemplary operations associated with the MultipointHead BFD session and MultipointTail BFD session are further explained below in FIG. 3.

Figure 2A:
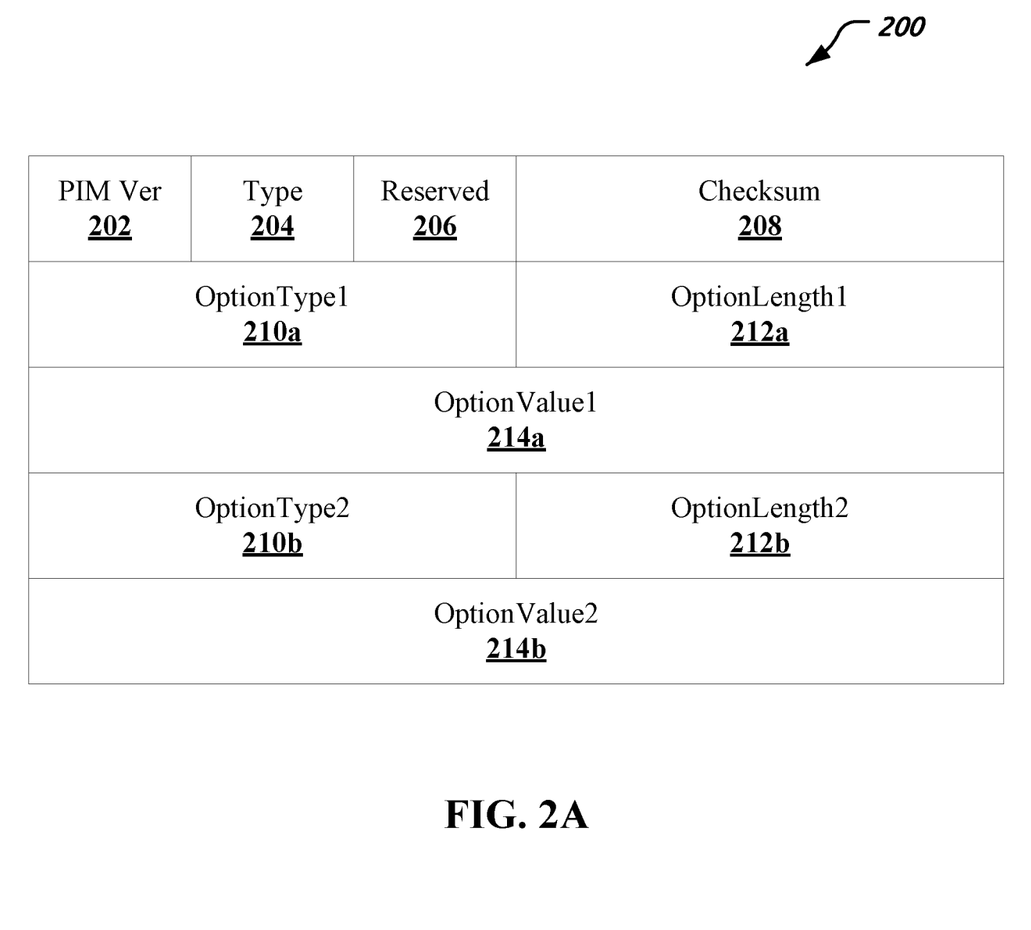
FIG. 2A shows a PIM Hello message with one or more Option Type-Length-Value (TLV).

FIG. 2A shows a PIM Hello message 200 with one or more Option Type-Length-Value (TLV). The first four octets of PIM Hello include fields: PIM Version field 202, Type field 204, Reserved field 206, Checksum field 208 followed by Option TLVs. The PIM Version field 202 value is 2, Type field 204 is 0 to indicate Hello Message, the Reserved field 206 is 0's, and the Checksum field 208 value can be a standard IP checksum and can be calculated prior to transmission.

The PIM Hello message 200 can be generated by a PIM-SM DR and can include one or more OptionType field 210a, 210b, one or more OptionLength field 212a, 212b, and one or more OptionValue field 214a, 214b. An OptionType field 210a can be used to describe the type of the option provided in the associated OptionValue field 214a. An OptionLength field 212a can describe the length of the associated OptionValue field 214a in bytes. The OptionValue field is a variable length field in part because the PIM Hello message 200 can include additional OptionType field 210b, OptionLength field 212b, and OptionValue field 214b, and so on, that can be repeated to describe additional operations to be performed by the one or more network nodes that receive the PIM Hello Message 200. The PIM Hello message has a flexible syntax that can be used to include multiple optional extensions that use a TLV format and can include a BFD Discriminator Type-Length-Value (TLV).

Figure 2B:
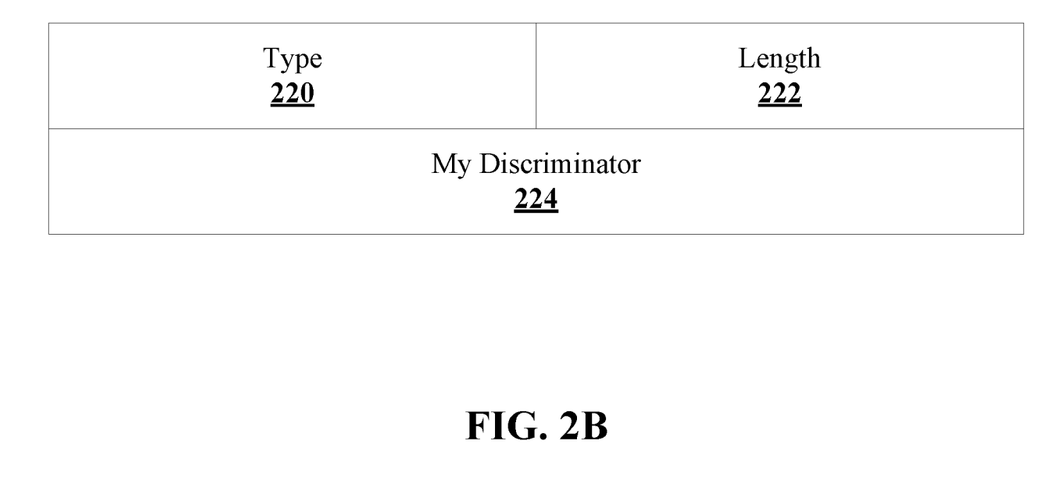
FIG. 2B shows a BFD Discriminator TLV included in the TLV fields of a PIM Hello Message.

FIG. 2B shows a BFD Discriminator TLV included in the TLV fields of a PIM Hello Message. For a BFD TLV, the OptionType field 220 can include a value that describes an operational session, such as a p2mp BFD session, in which failure can be detected by one or more network nodes. The OptionLength field 222 describes the length of the OptionValue field 224. For a BFD TLV, the OptionValue field 224 can include a unique non-zero identifier value that identifies a DR operating as a MultiPointHead to control transmission of packets that are used during an operational session and that are based on a pre-determined transmission interval. In some embodiments, the OptionValue field 224 can include a My Discriminator value for a BFD session. The Hello Message can be encapsulated in an IP packet so that the header of the Hello Message can include the IP address of the DR as the IP source address. In some embodiments, if a DR ceases to include a BFD TLV in its PIM-Hello message 200, the other PIM-SM nodes that receive the PIM-Hello message 200 close their corresponding MultipointTail BFD sessions.

Figure 3:
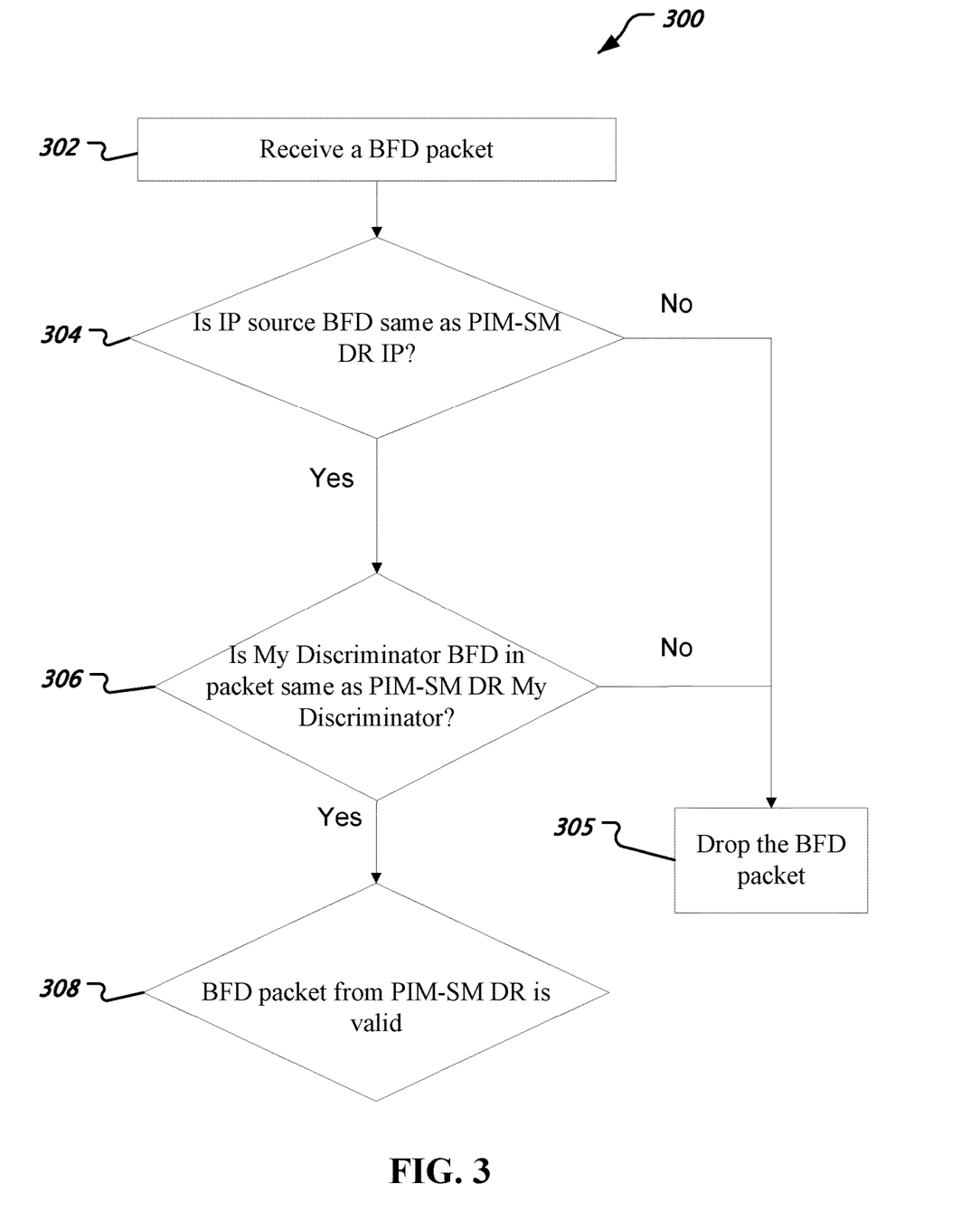
FIG. 3 shows an exemplary flowchart to process a BFD packet.

FIG. 3 shows an exemplary flowchart to process a BFD packet. In some embodiments, the BFD packet can be received and processed by a PIM-SM non-DR node operating a MultipointTail in a BFD session to monitor the DR. The BFD packet can be encapsulated in an IP packet. At the receiving operation 302, a network node or a component, such as a non-DR router, can receive from a DR a BFD packet that can include an identifier value, such as a My Discriminator value, that identifies a DR operating as a MultiPointHead. In some embodiments, a timer associated with a pre-determined transmission interval value can be used by the network node to determine whether a system is active by verifying that a valid BFD packet from a DR is received before the timer expires or while the timer is running. In such embodiments, the network node can start the timer prior to the receiving operation 302. In some embodiments, the network node can receive a Hello Message from a DR prior to the receiving operation 302. The Hello Message can include a My Discriminator value for the DR operating as a MultipointHead in a BFD session, a type of the failure detection session, and a length of the My Discriminator value.

In some embodiments, a first determining operation 304 can be performed where the network node can determine whether the IP source address included in a header of the BFD packet is the same as the IP address of the PIM-SM DR. If the IP source address in the header of the BFD packet is the same as the IP address of the DR, the process can continue at the second determining operation 306. If the IP source address in the header of the BFD packet is not the same as or is different from the IP address of the DR, then the BFD packet is dropped at the dropping operation 305.

At the second determining operation 306, the network node determines whether the identifier included in the BFD packet is the same as the My Discriminator value of the PIM-SM DR. If the identifier included in the BFD packet is the same as the My Discriminator value of the PIM-SM DR, then the network node considers the BFD packet from the PIM-SM DR to be valid at the validation operation 308. In some embodiments, the network node may reset the timer associated with the pre-determined transmission interval value when the network node considers the BFD packet to be valid.

If the My Discriminator value included in the BFD packet is not the same as or is different from the My Discriminator value of the PIM-SM DR, then the BFD packet is dropped at the dropping operation 305. In some embodiments, the network node can determine whether the timer has expired without having received a valid BFD packet from a DR, and then the network node can send a packet to the DR to inform the DR that the operational session is down or inactive. In some implementations, the packet sent by the network node to the DR can includes a status field that indicates that the operational session is inactive.

The agility of multicast service can be improved by introducing a role of Backup DR (BDR) and adding explicit DR and BDR advertisement in PIM-SM Hello message. However, if BDR fails, then the DR will be unprotected until all other PIM-SM nodes on the Ethernet segment detect that failure. Further, the failure detection interval for BDR is 105 seconds, which is the same for detecting failure of the DR. In some embodiments, creating and using a BFD session as described above in FIGS. 2 and 3 to monitor liveness of the BDR can also improve resiliency of the multicast service. For example, the process described above in FIGS. 2 and 3 used to initiate a BFD session by DR and to process packets by the neighbors of the DR can be applicable to the BDR.

Figure 4:
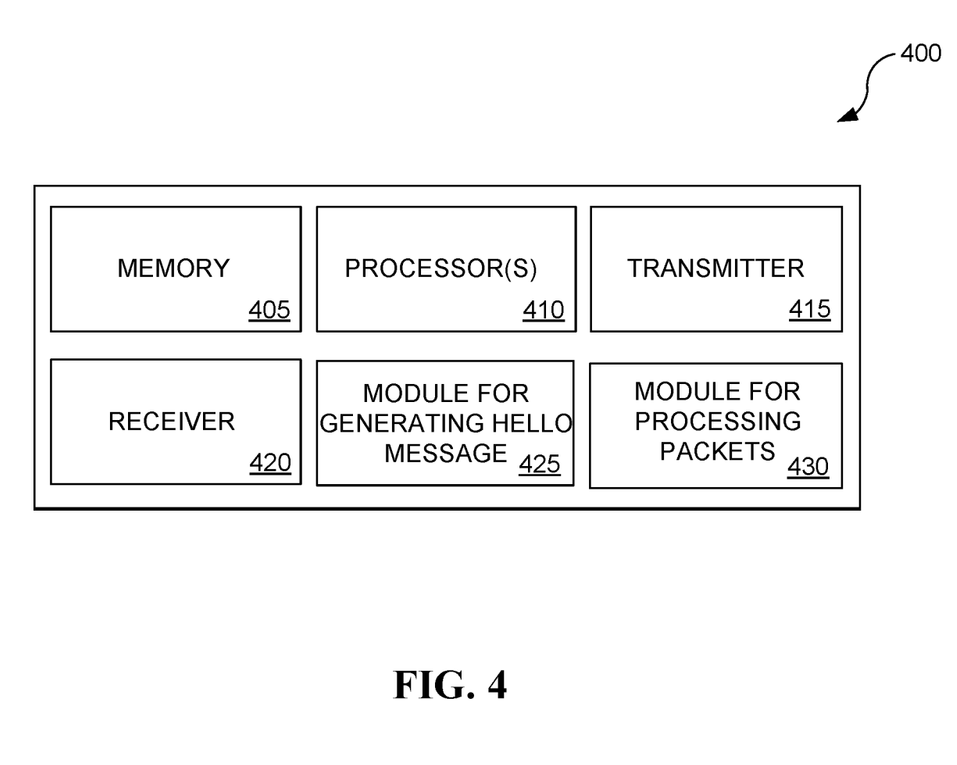
FIG. 4 shows a block diagram for an exemplary packet communication apparatus.

FIG. 4 shows a block diagram for an exemplary packet communication apparatus to implement the methods described in this patent document. The packet communication apparatus 400 includes at least one processor 410 and a memory 405 having instructions stored thereupon, where the instructions upon execution by the at least one processor, configure the apparatus to perform one or more operations as described in FIGS. 2 and 3. The packet communication apparatus 400 can be a node that can generate or process a packet that can include a Hello Message or a BFD packet. The packet communication apparatus 400 includes a transmitter 415 and a receiver 420 for transmitting and receiving packets in a communication network. The processor may perform the generating and processing operations as described herein and control a network interface to transmit or receive the messages and packets.

Figure 5:
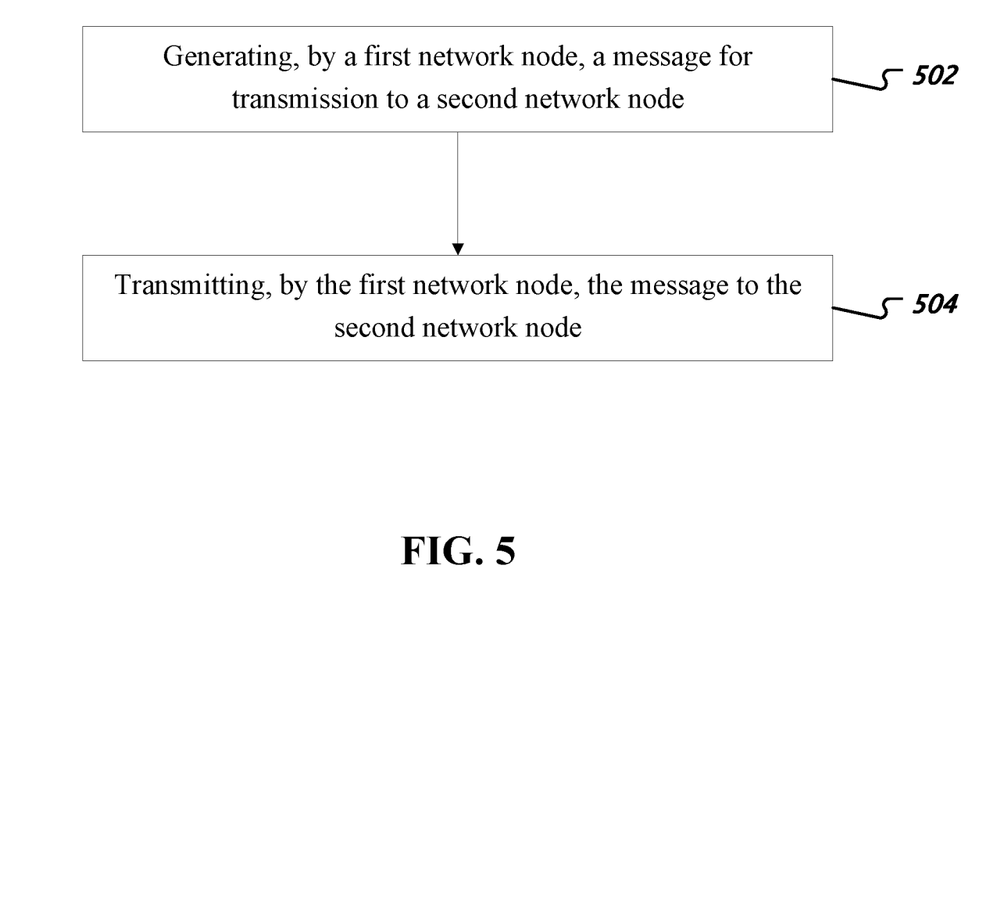
FIG. 5 shows an exemplary flowchart for generating a PIM Hello message with a My Discriminator TLV.

The module for generating Hello message 425 can generate a Hello Message that includes values associated with the BFD TLV as described in FIGS. 2A, 2B, and 5.

Figure 6:
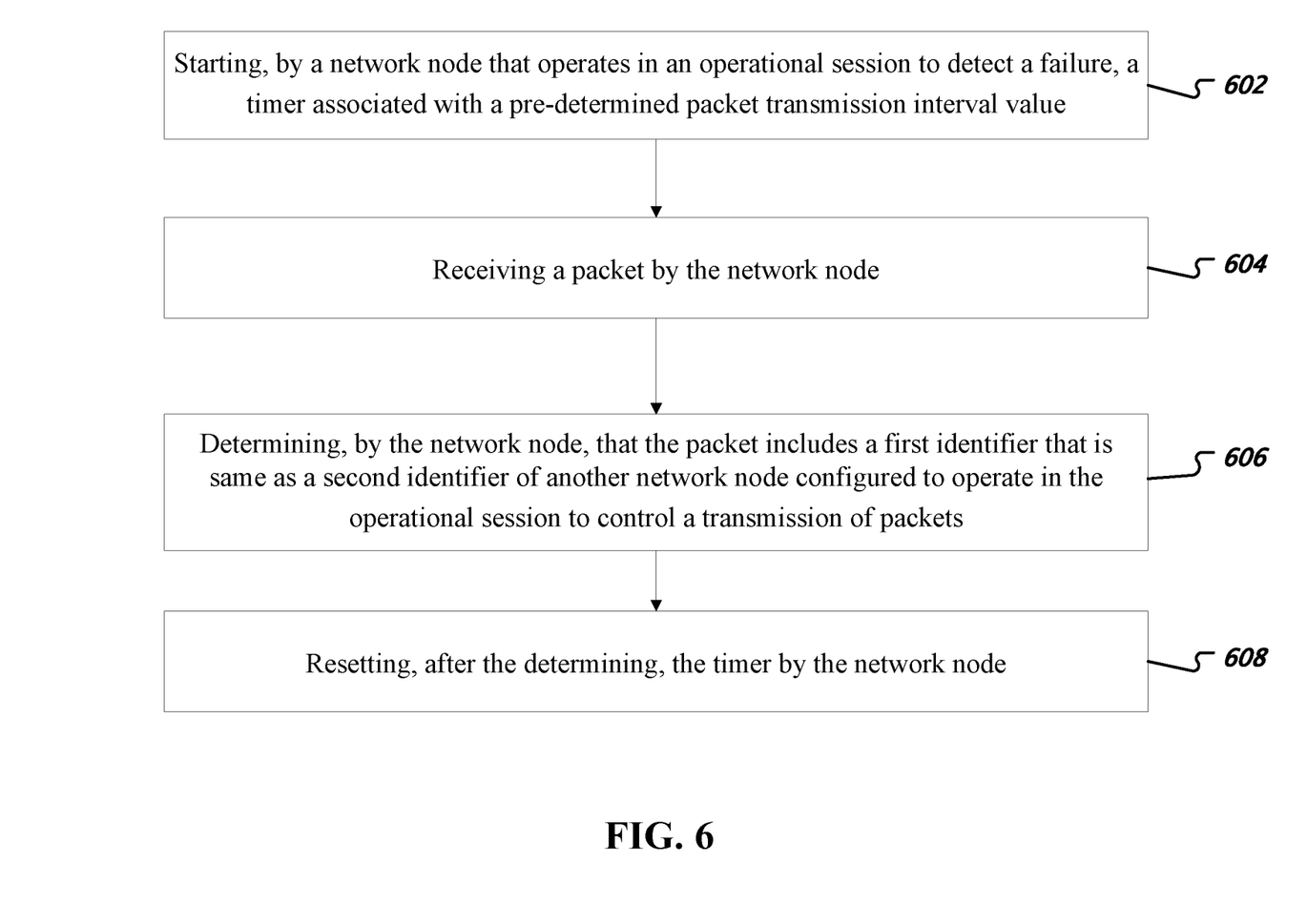
FIG. 6 shows an exemplary flowchart for processing a received packet.

The module for processing packets 430 can process the packets, as described in FIGS. 3 and 6. For example, the module for processing packets 430 can process the Hello Message to obtain information about the DR, such as the My Discriminator or the DR IP Address. In another example, the module for processing packets 430 can receive and process a packet as described in FIG. 6.

FIG. 5 shows an exemplary flowchart for generating a PIM Hello message with a My Discriminator TLV. At the generating operation 502, a first network node generates a message, such as a PIM Hello message, for transmission to a second network node. The first and second network nodes are configured to operate in an operational session, such as a BFD session, in which the second network node is configured to detect a failure. Furthermore, the first and second network nodes can operate in PIM-SM, where the first network node includes a DR or a BDR.

The message includes a value that identifies a type of the operational session, an identifier of the first network node configured to control transmission of packets used during the operational session, and a length of the identifier. In some embodiments, the type can describe a p2mp BFD session, the length can describe the length of the identifier field that can include a My Discriminator value.

At the transmitting operation 504, the first network node transmits the message to the second network node.

In some embodiments, the first network node can transmit packets that include the identifier of the first network node. The packets can be transmitted based on a pre-determined packet transmission interval during the operational session.

FIG. 6 shows an exemplary flowchart for processing a received packet. At the starting operation 602, a network node that operates in an operational session to detect a failure starts a timer associated with a pre-determined packet transmission interval value. At the receiving operation 604, the network node receives a packet. In an exemplary embodiment, the packet is received by the network node before the timer expires or while the timer is running. In some embodiments, prior to receiving operation 604, the network node receives a message, such as a PIM Hello message, that include a value that identifies a type of the operational session, the second identifier of another network node, and a length of the second identifier.

At the determining operation 606, the network node determines whether the packet received by the network node includes a first identifier that is same as a second identifier of another network node configured to operate in the operational session to control a transmission of packets. The second identifier can be a My Discriminator value, the another network node can include a DR or a BDR, and the operational session can be a BFD session. The network node and the another network node can operate in a Protocol Independent Multicast Sparse Mode (PIM-SM). If the first identifier of the packet is the same as the second identifier of another network node, the process moves to the resetting operation 608 where the network node resets the timer. If the first identifier of the packet is not the same as the second identifier of another network node, then the network node that received the packet can drop the packet.

In some embodiments, a network node can close the operational session in response to receiving a message with an absence of a value that identifies a type of the operational session, the second identifier of the another network node, and a length of the second identifier.

In some embodiments, the network node determine that the timer has expired, and in response, can send to another node a packet that includes a status field that indicates that the operational session is inactive.

In some embodiments, two PIM-SM routers can be connected to the same Ethernet segment and can generate and process the Hello Message and BFD control packet as described in this patent document. In some other embodiments, three or more PIM-SM routers can be connected on the same Ethernet segment. Because PIM-SM Hello message as well as p2mp BFD control packet may be addressed to ALL-PIM-ROUTERS, for example, to IP addresses 224.0.0.13 for IPv4 or ff02::d for IPv6, both the Hello message and the control packet may be processed by all routers connected to the Ethernet segment. For embodiments that include three or more PIM-SM routers, the non-DR nodes can derive their role in p2mp BFD based on their non-DR role in PIM-SM on the given Ethernet segment.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A packet communication method, comprising:
    starting, by a first network node, a timer, wherein the first network node and a second network node operate in an operational session that detects a continuity of path between the first network node and a second network node;
    receiving a packet by the first network node;
    performing a first determination that the packet includes a first Internet Protocol (IP) address that is the same as a second IP address of the second network node configured to control a transmission interval of packets;
    performing a second determination, by the first network node, that the packet includes a first identifier that is the same as a My Discriminator value of the second network node configured to control the transmission interval of the packets; and
    resetting, after the first determination and the second determination, the timer by the first network node.

2. The packet communication method of claim 1, further comprising:
    receiving, by the first network node and prior to the receiving of the packet, a message that includes
        a value that identifies a type of the operational session,
        the My Discriminator value of the second network node, and
        a length of the My Discriminator value; and
    creating, by the first network node after receiving the message, the operational session.

3. The packet communication method of claim 1, further comprising:
    closing, by the first network node, the operational session in response to receiving a message with an absence of
        a value that identifies a type of the operational session,
        the My Discriminator value of the second network node, and
        a length of the My Discriminator value.

4. The packet communication method of claim 1, wherein the packet is received by the first network node while the timer is running.

5. The packet communication method of claim 1, further comprising:
    sending, by the first network node after an expiration of the timer, another packet to the second network node, wherein the another packet includes a status field that indicates that the operational session is inactive.

6. The packet communication method of claim 1, further comprising:
    dropping the packet in response to determining that the first identifier is different from the My Discriminator value of the second network node; and
    dropping the packet in response to determining that the first IP address included in the packet is different from the second IP address of the second network node.

7. The packet communication method of claim 1, wherein the first network node and the second network node operate in a Protocol Independent Multicast Sparse Mode (PIM-SM).

8. The packet communication method of claim 1, wherein the operational session is a Bidirectional Forwarding Detection (BFD) session.

9. The packet communication method of claim 1, wherein the second network node includes a Designated Router (DR) or a Backup Designated Router (BDR).

10. The packet communication method of claim 1, wherein a value for the timer is determined without performing a negotiation with the second network node.

11. A network node, comprising:
    a processor configured to:
    start a timer, wherein the network node and another network node are configured to operate in an operational session that detects a continuity of path between the network node and the another network node;
    receive a packet;
    perform a first determination that the packet includes a first Internet Protocol (IP) address that is the same as a second IP address of the another network node configured to control a transmission interval of packets;
    perform a second determination that the packet includes a first identifier that is the same as a My Discriminator value of the another network node configured to control the transmission interval of the packets; and
    reset, after the first determination and the second determination, the timer.

12. The network node of claim 11, wherein the processor is further configured to:
    receive, prior to the received packet, a message that includes
        a value that identifies a type of the operational session,
        the My Discriminator value of the another network node, and
        a length of the My Discriminator value; and
    create, by the first network node after receiving the message, the operational session.

13. The network node of claim 11, wherein the processor is further configured to:
    close the operational session in response to receiving a message with an absence of
        a value that identifies a type of the operational session,
        the My Discriminator value of the another network node, and
        a length of the My Discriminator value.

14. The network node of claim 11, wherein the packet is received by the network node while the timer is running.

15. The network node of claim 11, wherein the processor is further configured to:
    send, after an expiration of the timer, another packet to the second node, wherein the another packet includes a status field that indicates that the operational session is inactive.

16. The network node of claim 11, wherein the processor is further configured to:
  drop the packet in response to determining that the first identifier is different from the My Discriminator value of the another network node; and
  drop the packet in response to determining that the first IP address included in the packet is different from the second IP address of the another network node.

17. The network node of claim 11, wherein the network node and the another network node are configured to operate in a Protocol Independent Multicast Sparse Mode (PIM-SM).

18. The network node of claim 11, wherein the operational session is a Bidirectional Forwarding Detection (BFD) session.

19. The network node of claim 11, wherein the another network node includes a Designated Router (DR) or a Backup Designated Router (BDR).

20. The network node of claim 11, wherein a value for the timer is determined without a performance of a negotiation with the another network node.

* * * * *